March 8, 1938.   H. W. GOULDTHORPE   2,110,663

BRAKE

Filed June 7, 1935

Inventor:
Hubert W. Gouldthorpe,
by Harry E. Dunham
His Attorney.

Patented Mar. 8, 1938

2,110,663

UNITED STATES PATENT OFFICE 2,110,663

BRAKE

Hubert W. Gouldthorpe, Wesleyville, Pa., assignor to General Electric Company, a corporation of New York Application June 7, 1935, Serial No. 25,403

14 Claims. (Cl. 188—104)

My invention relates to brakes.

In constructing brakes, such as electrical brakes, various schemes have been devised for dissipating the heat generated in the wheel or rotor thereof during braking, generally involving ventilation in which air is forced through passageways formed in the wheel. Although such provisions for cooling are generally adequate, during periods of extreme braking excessive heat may be generated. This excessive heating may distort the wheel and produce harmful stresses if no provision is made for free movement of the braking surface relative to its hub, to permit their accommodation to expansions and contractions resulting from these temperature variations.

An object of my invention is to provide an improved electrical brake.

Another object of my invention is to provide an improved brake wheel wherein the heat, due to braking, is effectively dissipated and in which the wheel of the brake is rigid, both torsionally and axially, without being subject to injurious stresses or strains under varying temperature conditions.

Further objects and advantages of my invention will become apparent as the following description proceeds, and the features of novelty which characterize my invention will be pointed out with particularity in the claims annexed to and forming a part of this specification.

Figure 1:
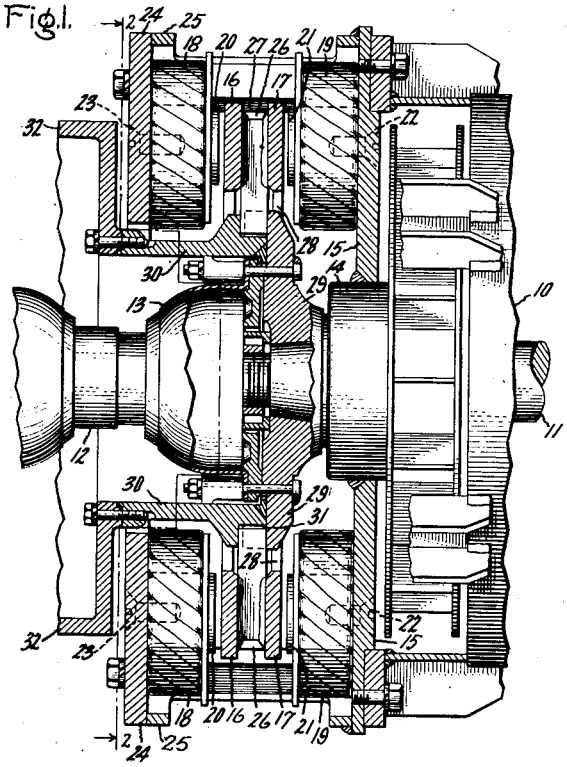
Figure 3:
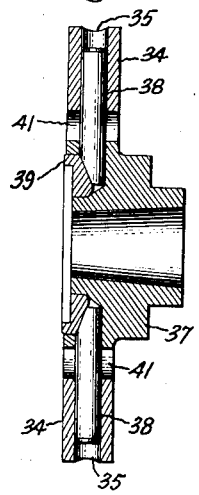
Figure 4:
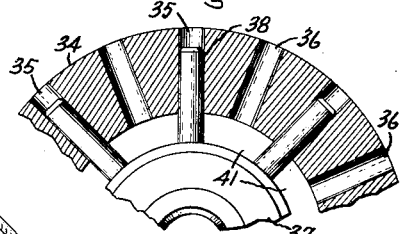
Figure 2:
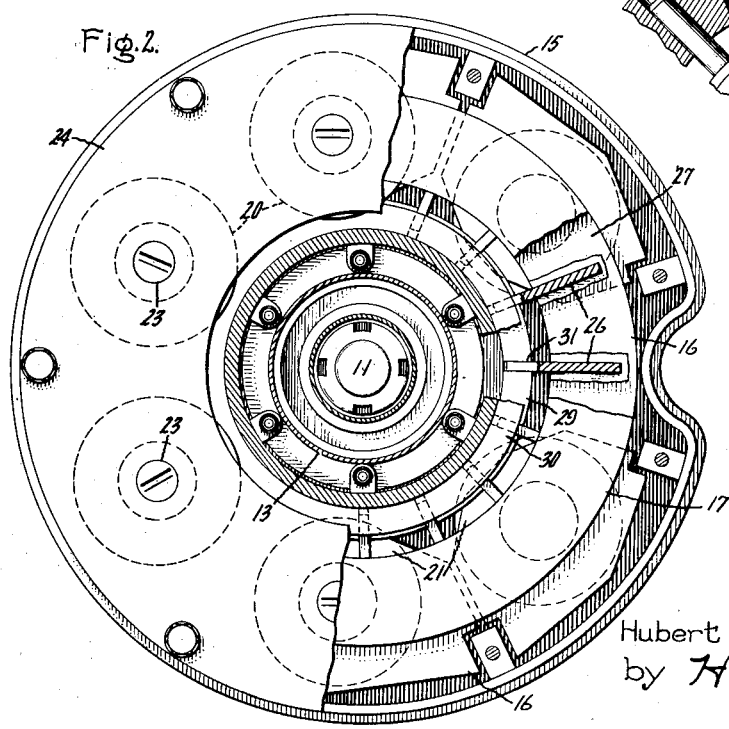

For a better understanding of my invention, reference is made to the accompanying drawing, wherein Fig. 1 is a side elevation, in partial section, illustrating an electrical brake embodying my invention; Fig. 2 is an end view taken along the line 2—2 of Fig. 1, with the stationary field structure of the brake partly broken away to better illustrate the construction; Fig. 3 is a sectional side elevation illustrating a modification of my improved brake wheel; and Fig. 4 is a fragmentary end elevation, partly in section, of the construction shown in Fig. 3.

Referring to Figs. 1 and 2 of the drawing, I have shown an electrical brake embodying my invention in connection with an electric motor 10 provided with a shaft 11 connected to a driven shaft 12 by a coupling 13 and supported in a bearing 14 mounted in the motor end head 15. The braking torque is produced by eddy-currents induced in two electrically conductive annular members 16 and 17 adapted to rotate in a stationary magnetic field produced by field exciting windings 18 and 19 of a stationary field structure.

The stationary field structure includes a number of field poles 20 and 21 extending axially of the rotor and arranged in two sets about the axis of the motor and supported on the motor end head 15. The poles 21 of one set are secured by screws 22 to the end head 15 and are equally spaced from the axis of the motor. The poles 20 are in axial alignment with the poles 21 and the faces of the poles 20 and 21 are spaced apart. The faces of each set of poles are arranged in substantially the same transverse plane. The set of poles 20 are secured by screws 23 to a transverse plate 24 having an opening therein coaxial with the motor shaft and secured to the end head 15 by a cylindrical frame 25. These sets of field poles are excited by the field exciting windings 18 and 19, which may be electrically energized in any suitable manner, and the pairs of coaxial poles 20 and 21 are preferably excited so as to be of opposite polarity.

A braking torque is exerted on the motor shaft 11 and the driven shaft 12 by a rotor or brake wheel having two electrically conductive annular members or disks 16 and 17 in which eddy-currents are generated by rotation in the magnetic fields set up in the poles 20 and 21. These disks are rigidly joined together and spaced apart by spokes 26 welded to the disks, and the spokes are arranged in symmetrical, circumferentially spaced relation. This provides a brake wheel having an annular rim, which is substantially an impeller type fan with a number of radial ventilating passages 27 intermediate the sides of the rim with openings at each end thereof and communicating with the outer peripheral surface of the annular rim member formed by the disks 16 and 17. The spokes 26, which are located in these radial passages, form radial impeller blades and fins in good thermal contact with the disks 16 and 17, in which the heat, due to the eddy-currents, is generated. Adequate circulation of cooling air is obtained by mounting the rotor in a radially spaced relation upon a hub, thereby forming axial ventilating passages 28 communicating with the radial brake wheel ventilating passages 27 intermediate the ends thereof, as shown in Fig. 1, through which air is blown by the spokes 26 upon rotation of the wheel.

The hub is a fabricated unit mounted upon the motor drive shaft 11 formed of two parts 29 and 30 welded together. One of these parts is a disk 29, which is rigidly mounted on the motor shaft, and which is slotted to form guides 31 for the spokes 26. The other part of the hub is a cylinder 30 secured to the disk 29 and extending axially of the motor shaft through the opening in the transverse plate 24. A brake drum 32 is mounted on the cylindrical portion of the hub 30, so that the eddy-current brake can be supplemented by a mechanical brake engaging the drum 32. In this embodiment of my invention, the guides 31 provide a sliding connection between the spokes 26 and the hub and retain the rotor coaxial with the motor shaft 11 and in a radially freely expansible relation upon the hub permitting its accommodation to expansions and contractions produced by temperature variations resulting from heating during braking. This arrangement provides a torsionally and axially rigid wheel structure free from injurious stresses or strains which might be set up during operation.

In the modification of my improved brake wheel, illustrated in Figs. 3 and 4, the rotor comprises a single annular member or rim 34, in which are formed a series of circumferentially spaced, radial outwardly extending passages 35 and 36 intermediate the sides of the rim 34 with openings at each end of the radial passages and arranged to communicate with the outer peripheral surface of the annular rim 34. This rotor 34 is maintained in a radially freely expansible and spaced relation upon a hub 37 coaxial therewith by cylindrical spokes 38 inserted through the passages 35, which are interposed between pairs of the passages 36. These spokes 38 are slidably fitted in the passages 35 and extend into corresponding holes in the hub 37 to which they are secured by welding, as indicated at 39. The hub 37 is adapted to be mounted on the motor shaft 11 in the construction shown in Figs. 1 and 2.

As can be readily seen, this simplified construction provides a brake wheel structure which is torsionally and axially rigid, and wherein the members, subject to temperature variations due to heating during braking, are relatively free to move with respect to each other. The brake wheel is essentially an impeller type fan and provides an efficient cooling arrangement wherein the air is blown though axial passages 41 communicating intermediate the ends thereof with the radial rotor ventilating passages 36.

Modifications of the embodiments of my invention, which I have illustrated and described, will occur to those skilled in the art. I desire it to be understood, therefore, that my invention is not to be limited to the particular arrangements disclosed and I intend, in the appended claims, to cover all modifications which do not depart from the spirit and scope of my invention.

What I claim as new and desire to secure by Letters Patent of the United States, is:

1. An electrical brake including an induction rotor having an annular member with radially outwardly extending ventilating passages intermediate the sides of said annular member with openings at each end thereof, a hub, means for mounting said rotor in radially freely expansible relation on said hub, said mounting means supporting said rotor upon said hub in a radially spaced relation thereto to form axial ventilating passages communicating intermediate the ends thereof with said outwardly extending passages, and means including field exciting windings for exerting a braking torque on said rotor.

2. An electrical brake having a field structure, means including a plurality of circumferentially spaced field exciting windings for producing a flux in said field structure, a hub, a rotor having an annular eddy-current member adapted to rotate adjacent and in inductive relation with said field structure, said rotor having outwardly extending ventilating passages formed therein intermediate the sides of said annular member with openings at each end thereof and having axial ventilating passages communicating intermediate the ends thereof with said outwardly extending passages, and means for mounting said rotor concentrically on said hub and freely expansible radially with respect thereto.

3. An electrical brake including a field structure having field exciting windings, a hub having circumferentially spaced openings therein, a rotor associated with said field structure and including a pair of electrically conductive annular members axially spaced apart, and means including spokes joining said annular members together and arranged in the openings in said hub for supporting said annular members in a radially spaced relation on said hub and freely expansible radially with respect thereto.

4. An electrical brake including a field structure having a field exciting winding, a shaft, a hub mounted on said shaft and comprising a slotted disk and a cylindrical axially extending member, a rotor associated with said field structure and including a pair of electrically conductive annular members axially spaced apart, and means including spokes in thermally conductive relation with said annular members and mounted on said slotted disk for supporting said annular members in a radially spaced relation on said hub and freely expansible radially with respect thereto.

5. An electrical brake including a field structure having a field exciting winding, a shaft, a hub mounted on said shaft, said hub comprising a disk and a cylindrical member connected together and arranged to form guides, a rotor associated with said field structure and including a pair of electrically conductive annular members axially spaced apart, and means including spokes joining said annular members together and arranged in said guides for supporting said annular members on said hub in radially spaced relation thereto.

6. An electrical brake including a field structure having a field exciting winding, a shaft, a hub mounted on said shaft, a plurality of circumferentially spaced spokes carried by said hub, and an annular rim associated with said field structure and having a plurality of outwardly extending radial passages formed therein having an opening at each end thereof and communicating with the outer peripheral surface of said annular rim intermediate the sides thereof, said spokes being slidably fitted in said outwardly extending passages.

7. A brake wheel including an annular rim member having outwardly extending ventilating passages therein intermediate the sides of said annular member with openings at each end thereof, a hub, and means for concentrically mounting said rim on said hub and for providing free radial expansion of said rim with respect to said hub, said rim being radially spaced from said hub to provide an axial ventilating passage communicating intermediate the ends thereof with said outwardly extending passages.

8. A brake wheel including an annular rim member having outwardly extending ventilating passages therein, a hub, and means carried by said rim for mounting said rim on said hub and for providing free radial expansion of said rim with respect to said hub, said rim being radially spaced from said hub to provide an axial ventilating passage communicating intermediate the ends thereof with said outwardly extending passages.

9. A brake wheel including an annular rim member having outwardly extending ventilating passages formed therein having openings at each end thereof and communicating with the outer peripheral surface of said annular member intermediate the sides thereof, a hub, and means carried by said hub for mounting said rim thereon and for providing free radial expansion of said rim with respect to said hub.

10. A brake wheel including an annular rim having outwardly extending ventilating passages formed therein having an opening at each end thereof and communicating with the outer peripheral surface of said annular rim intermediate the sides thereof, a hub, and means carried by said rim for concentrically mounting said rim on said hub and for providing free radial expansion of said rim with respect to said hub.

11. A brake wheel including electrically conductive annular members axially spaced apart, a hub having circumferentially spaced openings therein, and means including spokes joining said annular members together and arranged in said openings in said hub for mounting said annular members in radially spaced relation on said hub and for providing free radial expansion of said annular members with respect to said hub.

12. A brake wheel including a hub comprising a slotted disk and a cylindrical axially extending member, a pair of electrically conductive annular members axially spaced apart, and means including spokes in thermally conductive relation with said annular members and arranged in the slots in said slotted disk for mounting said annular members in radially spaced relation on said hub and for providing free radial expansion of said annular members with respect to said hub.

13. A brake wheel including an annular rim having outwardly extending passages formed therein having an opening at each end thereof and communicating with the outer peripheral surface of said annular rim intermediate the sides thereof, and a hub having circumferentially spaced spokes carried thereon, said spokes being slidably fitted in said outwardly extending passages.

14. A brake wheel including an annular rim having outwardly extending passages formed therein having an opening at each end thereof and communicating with the outer peripheral surface of said annular rim intermediate the sides thereof, and a hub having circumferentially spaced spokes carried thereon, said spokes being slidably fitted in a plurality of said outwardly extending passages for providing free radial expansion of said rim with respect to said hub.

HUBERT W. GOULDTHORPE.